April 21, 1964 R. A. JONES 3,130,134

PLATED CIRCUIT MAGNETIC CORE ARRAY

Filed Jan. 9, 1957 2 Sheets-Sheet 1

INVENTOR.
RICHARD A. JONES

BY Marshall M. Truex

ATTORNEY 3,130,134

PLATED CIRCUIT MAGNETIC CORE ARRAY

Richard A. Jones, Poughkeepsie, N.Y., assignor to International Business Machines Corporation, New York, N.Y., a corporation of New York Filed Jan. 9, 1957, Ser. No. 633,369
3 Claims. (Cl. 204—15)

This invention relates to magnetic core memory arrays and is directed more particularly to a method of fabrication of an array.

Magnetic core arrays are well known in the art and have the form of a lattice of magnetic cores in which the cores have two well-defined extremes of magnetization for representing two values necessary to store binary signals. A detailed explanation of the theory of operation of a typical array is described in the application of E. W. Bauer and M. K. Haynes, Serial No. 443,284, filed July 15, 1954.

It is conventional to assemble magnetic core arrays manually with windings being threaded through the cores. This technique of assembly has become increasingly time consuming and expensive due to the requirement of greater capacity memory arrays and the tendency of using smaller sized cores. In the copending application of E. Gessner, Serial No. 633,370, filed January 9, 1957, now U.S. Patent No. 2,910,675, there is described a magnetic core array and its method of construction in which threading the various windings through the cores is avoided.

In this invention, the method for fabricating the array includes the steps for forming a plurality of openings in a sheet of material, placing the cores in the openings, and forming the various windings of the array which are insulated from one another by successive coating and plating operations. The article thus formed is a rigid array of cores in which the portion of a given winding which is within the opening of a core is coaxial with the opening.

It is an object of this invention to provide an improved method for constructing a magnetic core array which eliminates the need for manually threading conductors through the core holes by employing a plating operation.

It is an object of this invention to provide an improved process for fabricating a magnetic core array that is capable of performance by a self-regulated or programmed machine.

It is an object of the invention to provide an improved process for fabricating a magnetic core array that is capable of automatic production-line manufacture.

It is an object of this invention to provide an improved method for constructing a core array which lends itself readily to automatic manufacture in an economical and high speed process.

It is a still further object of this invention to provide a method for fabricating a magnetic core array by placing cores in openings in a plate and forming the various windings of the array which are insulated from one another by successive coating and plating operations.

Other objects of the invention will be pointed out in the following description and claims and illustrated in the accompanying drawings, which disclose, by way of example, the principle of the invention and the best mode, which has been contemplated, of applying that principle.

Figure 1:
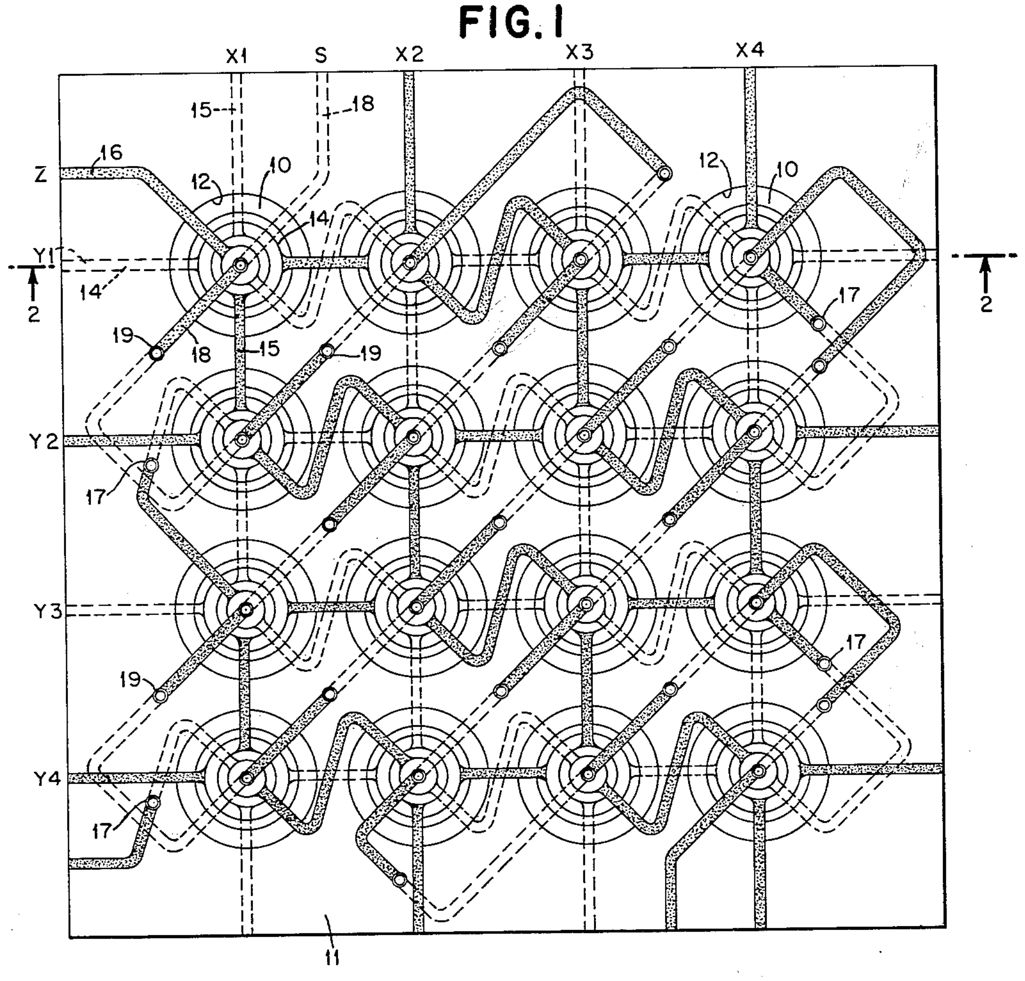
FIGURE 1 is a view of a major surface of a core array and further illustrates the winding arrangement constructed in accordance with the principles of this invention.

With reference to FIGURE 1, a single plane of magnetic core array is shown with magnetic cores 10, which are arranged in rows and columns and linked by X windings, Y windings, a Z winding, and an S winding. The copending application, Serial No. 443,284, filed July 14, 1954, now U.S. Patent No. 2,889,540, referred to previously, illustrates and describes the manner of electrically selecting a particular core by use of X windings, Y windings and a Z winding. A sheet of material 11 receives the magnetic cores 10 in openings 12.

Figure 2:
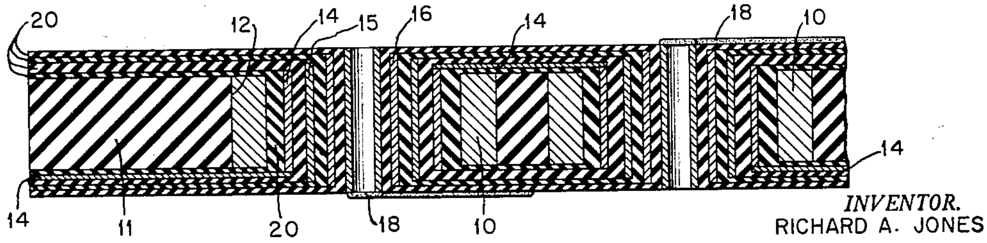
FIGURE 2 is a sectional view of the array of FIGURE 1 taken along the line 2—2.

In FIGURES 1 and 2, a $Y_1$ conductor 14 passes along the underside of the array in a plane beneath the plane of the cores to the $X_1Y_1$ core, links the latter, passes along a plane above the cores to ehe adjacent $X_2Y_1$ core, and continues in like manner linking each core in that row. An $X_1$ conductor 15 passes along the underside of the array in a plane beneath the core plane to the $X_1Y_1$ core, links the altter, passes along a plane above the cores to the adjacent $X_1Y_2$ cores and continues in like manner linking all $X_1$ cores in that column with a continuous circuit. It is conventional that the X and Y conductors are arranged to link individual cores in the same sense in order that the effect of driving pulses is additive. A Z winding 16 links all cores in the array by linking all cores in the $Y_1$ row and then linking all of the cores in the $Y_2$,$Y_3$, and $Y_4$ rows in order. The sense of the Z winding is opposite the sense of the $X_1$ and $Y_1$ conductors, and in this connection, the Z winding is arranged to pass through openings 17 in the sheet 11 to pass current from one side of the array to the other in accordance with required sense. An S winding 18 links all of the cores in the array by passing along the underside of the core plane, linking the $X_1Y_1$ code, passing along the upperside of the core plane, passing through one of a plurality of openings 19 in the sheet to the underside of the core plane, and then linking first the $X_1Y_2$ core, then the $W_2Y_1$ core, and in turn linking the remaining cores according to the pattern indicated by the path described.

After the openings 12, 17, and 19 have been formed in the sheet 11, the cores are deposited within the openings 12, and then a bonding agent may be applied over the plate to hold the cores in place. A coating 20, such as magnesium fluoride, is applied over the entire assembly of the plate and cores to insulate the cores electrically and form a base for printed circuits.

The printed circuits may be produced by the use of a template which permits the conductors to be applied at the desired places of the array.

Figure 4:
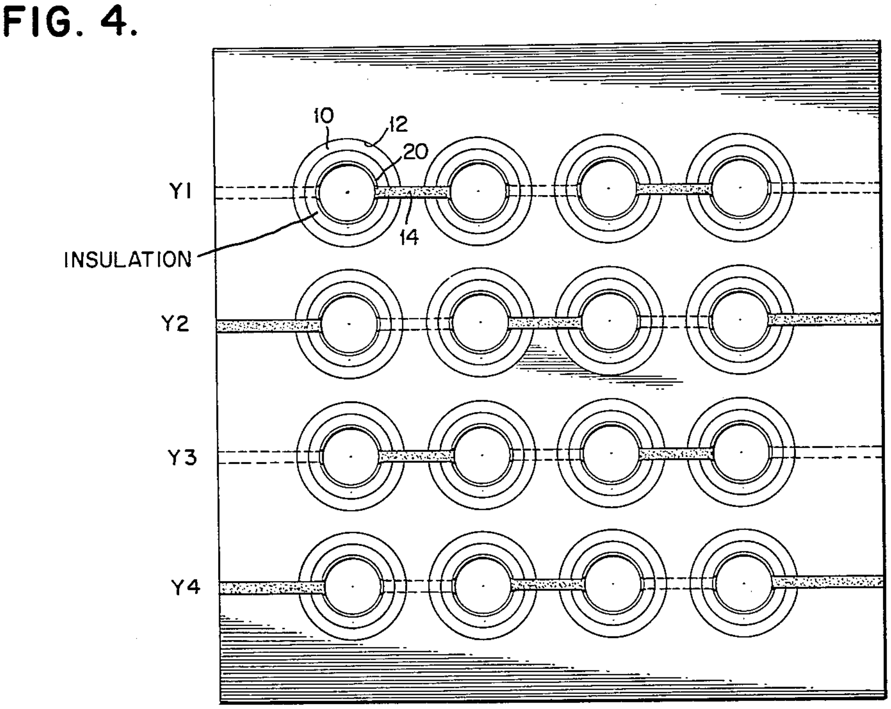
FIGURE 4 is a partially formed core array constructed in accordance with the principles of this invention.
Figure 3:
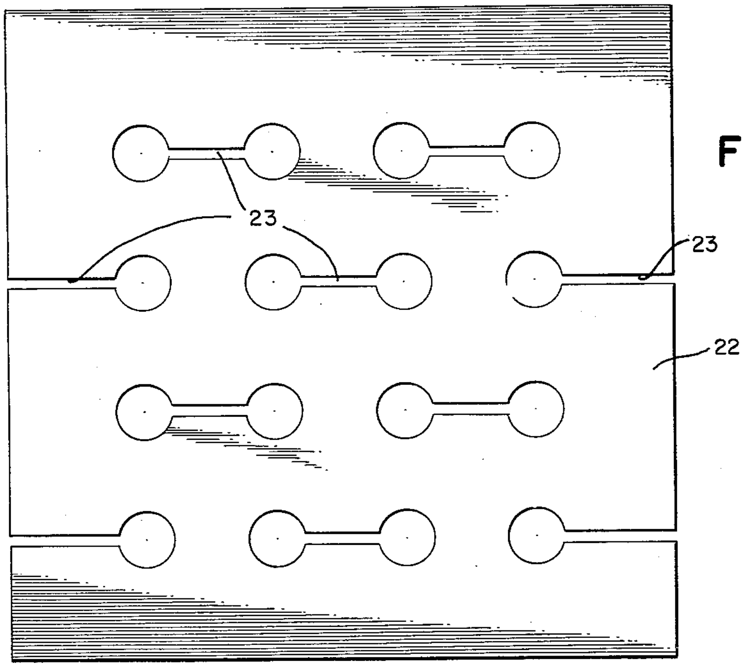
FIGURE 3 is a template used for construction of a portion of the Y conductors.

In FIGURE 3, a template 22 is provided with openings 23, which correspond with the pattern of Y windings desired on the uppermost major surface of the array and which permit a plating operation to take place within the openings of the cores. The template 22 is placed against the sheet, and then conductive paint is sprayed or otherwise deposited through the openings including the inner surface of the hole of each of the cores. This conductive paint provides the base for the uppermost Y conductors to be formed by plating. Similarly, the template may be reversed, or another template (not shown) used to form the Y conductors on the underside of the array to complete the winding pattern. The construction at this stage is shown in FIGURE 4.

The device is now put in a copper plating bath and all exposed areas of conductive paint representing Y circuitry are plated with this plating also including the inside walls within the core openings. Each winding therefore includes portions which alternate on the two sides of the array and those portions are interconnected by virtue of the coaxial conductor which is plated on the inside of the core opening. An insulation coating, such as magnesium fluoride, is again applied over the surface followed by the forming of the X winding pattern in a like manner to that for forming the Y windings, previously described. Insulation coating is again applied and the Z windings developed and plate, followed by another coating of insulation and the development of S windings according to the predetermined pattern arrangement described.

For ease of illustration, the thickness of the insulation has been over-emphasized. In practice, the thickness could be quite small depending only upon the insulating properties of the material used.

The sheet 11 may be of any suitable non-magnetic material since the circuitry is electrically insulated from the sheet by coatings of a material such as magnesium fluoride, lacquer, silicon monoxide, or like material. A preferred material for the sheet 11 would be a good conductor of heat and would be one in which the openings could be easily formed by punching, etching, or the like.

The term "plate" is used broadly to include any of the methods known in the art for depositing a pattern of conductive areas such as metal spraying, photographic electrodeposition, vacuum metalizing, or silk screen processes.

Many other winding configurations may be employed in the array of FIGURE 1. For example, the sense winding may link the cores in conventional manner such that the effects of partially excited cores are counteracted. Furthermore, the X and Y windings may be so arranged that one-third select is used instead of one-half select. It is pointed out that the various conductors of FIGURE 1 are illustrated as being placed such that they do not lie over one another except when passing through the holes of the cores. It is to be understood that since these conductors are in fact insulated from one another, when constructed as above described, they may over-lie one another, if desired.

Further, it will be understood that portions of the openings within the cores may be masked if desired to plate a portion of the coaxially spaced conductor of sufficient circumferential length to provide a continuous circuit through the cores. This would reduce the capacitance between coaxially-spaced conductors.

With reference to FIGURE 1, the terminus of each printed conductor may be used to engage a connection clip allowing coupling to external apparatus of a two dimensional array or to interconnecting groups of single planes to provide a three dimensional array unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the claims.

What is claimed is:

1. A process for fabricating an array of magnetic cores having coaxially spaced windings and interconnections comprising forming a plurality of openings in a sheet of insulating material, lodging individual cores in each of said openings, defining conductive areas on the surface of said sheet and through the openings of said cores where circuitry is desired, plating said conductive areas to form a first set of core windings and interconnecting circuits, coating said first set of windings and interconnecting circuits with a layer of insulating material, defining conductive areas on the surface of said layer of insulating material and through the openings of said cores where circuitry is desired, plating said conductive areas to form a second set of core windings and interconnecting circuits, coating said second set of windings and interconnecting circuits with a third layer of insulating material, defining conductive areas on the surface of said third layer of insulating material and through the openings of said cores where circuitry is desired, plating said conductive areas to form a third set of core windings and interconnecting circuits.

2. A process for fabricating an array of magnetic cores having plated circuit core windings and interconnections comprising forming a plurality of openings in a sheet of material, inserting and retaining individual cores in said openings, coating said sheet and said cores with a first layer of insulating material, depositing conductive material over the surfaces of said first layer of insulating material and within the openings of said cores where circuitry is desired, plating said conductive areas to form a first set of core windings and interconnecting circuits, coating said first set of windings and interconnecting circuits with a second layer of insulating material, depositing conductive material over the surfaces of said second layer of insulating material and within the openings of said cores where circuitry is desired, plating said conductive areas to form a second set of core windings and interconnecting circuits, coating said second set of windings and interconnecting circuits with a third layer of insulating material, depositing conductive material over the surfaces of said third layer of insulating material and within the openings of said cores where circuitry is desired, and plating said conductive areas to form a third set of core windings and interconnecting circuits.

3. In a process of fabricating an array of annular magnetic cores, the steps of (*a*) forming a plurality of openings in a sheet of insulating material, (*b*) placing individual cores co-axially in said openings, (*c*) applying a first insulating coating over the exposed surfaces of said sheet and said cores, (*d*) forming an electrodeposited metal circuit on said insulating layer and extending through said cores, (*e*) appyling a second insulating coating over the entire exposed surfaces of said circuit, and (*f*) forming a second electrodeposited circuit on the second insulating layer and extending through said core.

References Cited in the file of this patent

UNITED STATES PATENTS

| | | |
|---|---|---|
| 2,502,291 | Taylor | Mar. 28, 1950 |
| 2,616,994 | Luhn | Nov. 4, 1952 |
| 2,676,392 | Buhrendorf | Apr. 27, 1954 |
| 2,700,150 | Wales | Jan. 18, 1955 |
| 2,719,965 | Person | Oct. 4, 1955 |
| 2,721,822 | Pritikin | Oct. 25, 1955 |
| 2,848,359 | Talmey | Aug. 19, 1958 |

UNITED STATES PATENT OFFICE

CERTIFICATE OF CORRECTION

Patent No. 3,130,134 April 21, 1964

Richard A. Jones

It is hereby certified that error appears in the above numbered patent requiring correction and that the said Letters Patent should read as corrected below.

Column 1, line 30, for "for forming" read -- of forming --; column 2, line 14, for "ehe" read -- the --; line 18, for "altter" read -- latter --; line 33, for "code" read -- core --; same column 2, line 36, for "$W_2Y_1$" read -- $X_2Y_1$ --; column 3, line 4, for "plate" read -- plated --; line 18, for '"plate"' read -- plated --; column 4, line 47, for "appyling" read -- applying --.

Signed and sealed this 6th day of October 1964.

(SEAL)
Attest:

ERNEST W. SWIDER
Attesting Officer

EDWARD J. BRENNER
Commissioner of Patents